Nov. 10, 1959 J. P. H. HALLMANN 2,912,516

TAPE GUIDING DEVICE

Filed Dec. 1, 1955

INVENTOR
JOHAN PAUL HEINRICH HALLMANN

BY Fred M. Vogel
AGENT

United States Patent Office 2,912,516

Patented Nov. 10, 1959

2,912,516

TAPE GUIDING DEVICE

Johan Paul Heinrich Hallmann, Eindhoven, Netherlands, assignor, by mesne assignments, to North American Philips Company, Inc., New York, N.Y., a corporation of Delaware Application December 1, 1955, Serial No. 550,442

Claims priority, application Netherlands October 1, 1955

8 Claims. (Cl. 179—100.2)

Figure 1:
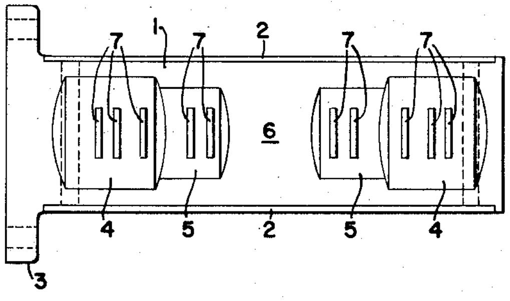

The present invention relates to a guiding device for tapes and tape-like material. More particularly, the invention relates to a guiding device for magnetic tape.

In accordance with the present invention, the device has at least two guiding paths for tapes of different widths, the guiding path for the smaller width lying within a depression of the guiding path for the larger width, the gap of at least one magnet head comprised in the member projecting beyond each of the guiding paths. This provides the advantage that the device can be used for different widths of the tape without the need for interchanging the member with a changeover to a different width. This is of particular importance in the present development of the picture-sound film technique.

The invention is otherwise not restricted to picture-sound film technique.

The guiding device of the present invention may also be utilized for calculating machines, in which the outlines for the various mathematical operations to obtain the final solution of a given problem are recorded on several magnetic tapes of different widths and can be carried out automatically at any instant. If various similar problems are to be solved, the outlines for the operations with all these problems are initially the same. Only in the final phase of the solution of each problem, deviations of the outlines will occur, so that a different magnetic tape will be used.

The invention may, moreover, be utilized in works, where various similar products are manufactured on a conveyor belt. The different machines and tools are actuated completely automatically by means of various magnetic tapes of different widths, on which the prescriptions intended for each machine and tool are recorded.

Of late years the film industry has tended to obtain a completely true reproduction of reality. It is endeavoured on the one hand to attain this by covering a larger angle of vision with the projected picture, which lead to systems such as "cinemascope" and "cinerama." On the other hand the sound reproduction is to be adapted to the larger dimensions of the screen by combining the picture projected on such a large screen with the use of spatial, diffuse sound reproduction. There may be circumstances, under which it is desirable to have a possibility with the said system to project a picture-sound film of normal size or of smaller size.

In order to have these possibilities available in one film projector, it is advantageous to provide it with the guiding device of the present invention, in which, in accordance with the invention, the size of the guiding paths in the direction of tape width is chosen to be such that picture-sound films of normal size and of large width and, if desired, also of smaller size can be guided by said device.

Although, in principle, each of the guiding paths need be provided with only one magnet head, in accordance with the invention, each of the guiding paths is provided at each edge with at least one magnet head. In practice, even two or more heads may be provided in each guide path, if use is made of the guiding device in the picture-sound film technique with a view to obtain a spatial diffuse, stereophonic or non-stereophonic sound reproduction. This offers the possibility of reproducing picture-sound films with two or more sound tracks on either side of the picture strip, i.e. of reproducing alternately films of different sizes with the aid of only the same guiding device. However, as an alternative, only one of the edges of each guiding path may be provided with two or more magnet heads.

In accordance with the invention it is advantageous to connect the electrical connecting terminals associated with each head to a common connecting block, which is arranged on the bottom side of the member. It is thus possible to construct the guiding device as a plug, which fits with the aid of guiding pins in a counter-plug associated with the supply member, so that due to the omission of external wiring a ready exchange is rendered possible.

Figure 2:
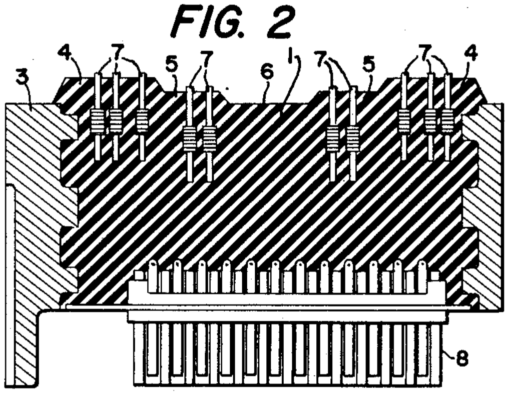

In order that the invention may be more readily carried into effect, it will now be described more fully with reference to the accompanying drawing, wherein:

Fig. 1 is a plan view of a preferred embodiment of the guiding device of the present invention;

Fig. 2 a longitudinal sectional view of the device of Fig. 1; and

Figure 3:
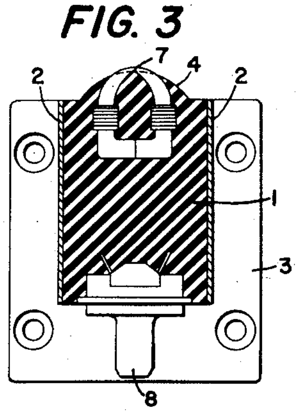

Fig. 3 a cross sectional view of the device of Fig. 1.

Referring to the figures, reference numeral 1 designates a block of insulating material, which is surrounded by a magnetically conductive wall 2 for magnetic screening. By means of the flange 3 the structure can be secured to a picture-sound film projector. At the top of the block 1 provision is made of the guiding path 4 for a picture-sound film of large width, for example 70 mms. This path has a depression, in which the guide path 5 for normal films, for example of 35 mms. is provided. Inside the guide path 5, provision is made of a space 6 for any third guiding path, over which a picture-sound film of smaller size can be guided. In the block 1 provision is made of various magnet heads, of which the gaps 7 project beyond the different guiding paths. The electrical connecting terminals associated with each head are connected to a common connecting block 8, which is secured to the bottom of the block 1.

While the invention has been described by means of a specific example and in a specific embodiment, I do not wish to be limited thereto, for obvious modifications will occur to those skilled in the art without departing from the spirit and scope of the invention.

What is claimed is:

1. A film tape guiding device comprising a support having a substantially flat surface of a given width, said surface being adapted to guide film tape of relatively large width in a transverse direction across said surface, a first depression in said surface having a width substantially smaller than said given width and being adapted to guide tape of relatively small width in a transverse direction across said surface, a plurality of means for recording and reproducing intelligence on said tape, and means positioning said recording and reproducing means in said support in operative relation with a tape guided thereby in a manner whereby at least one of said recording and reproducing means is positioned in operative relation to each tape guiding surface.

2. A film tape guiding device comprising a support having a substantially flat surface of a given width, said surface being adapted to guide film tape of relatively large width in a transverse direction across said surface, a first depression in said surface having a width substantially smaller than said given width and being adapted to guide tape of relatively small width in a transverse direction across said surface, a plurality of means for recording and reproducing intelligence on said tape, and means positioning said recording and reproducing means in said support in operative relation with a tape guided thereby in a manner whereby at least two of the said recording and reproducing means are positioned in operative relation to each tape guiding surface, said positioning means locating one of said means in operative relation with each edge of a tape guided by said support.

3. A film tape guiding device comprising a support having a substantially flat surface of a given width, said surface being adapted to guide film tape of relatively large width in a transverse direction across said surface, a first depression in said surface having a width substantially smaller than said given width and being adapted to guide tape of relatively small width in a transverse direction across said surface, a second depression in said first depression having a width substantially smaller than the width of the said first depression and being adapted to guide tape of relatively smaller width than that which the said first depression is adapted to guide in a transverse direction across said surface, a plurality of means for recording and reproducing intelligence on said tape, and means positioning said recording and reproducing means in said support in operative relation with a tape guided thereby in a manner whereby at least one of said recording and reproducing means is positioned in operative relation to each tape guiding surface.

4. A magnetic tape guiding device comprising a body of insulating material having a substantially flat surface of a given width, said surface being adapted to guide magnetic tape of relatively large width in a transverse direction across said surface, a first depression in said surface having a width substantially smaller than said given width and being adapted to guide magnetic tape of relatively small width in a transverse direction across said surface, a plurality of magnetic recording and reproducing heads, and means positioning said heads in said body in operative relation with a magnetic tape guided thereby in a manner whereby at least one of said heads is positioned in operative relation to each magnetic tape guiding surface.

5. A magnetic tape guiding device comprising a body of insulating material having a substantially flat surface of a given width, said surface being adapted to guide magnetic tape of relatively large width in a transverse direction across said surface, a first depression in said surface having a width substantially smaller than said given width and being adapted to guide magnetic tape of relatively small width in a transverse direction across said surface, a second depression in said first depression having a width substantially smaller than the width of the said first depression and being adapted to guide magnetic tape of relatively smaller width than that which the said first depression is adapted to guide in a transverse direction across said surface, a plurality of magnetic recording and reproducing heads, and means positioning said heads in said body in operative relation with a magnetic tape guided thereby in a manner whereby at least one of said heads is positioned in operative relation to each magnetic tape guiding surface.

6. A film tape guiding device comprising a support having a substantially flat surface of a given width, said surface being adapted to guide film tape of relatively large width in a transverse direction across said surface, a first depression in said surface having a width substantially smaller than said given width and being adapted to guide tape of relatively small width in a transverse direction across said surface, a plurality of means for recording and reproducing intelligence on said tape, and means positioning said recording and reproducing means across said given width in said support in operative relation with a tape guided thereby in a manner whereby at least one of said recording and reproducing means is positioned in operative relation to each tape guiding surface.

7. A magnetic tape guiding device comprising a body of insulating material having a substantially flat surface of a given width, said surface being adapted to guide magnetic tape of relatively large width in a transverse direction across said surface, a first depression in said surface having a width substantially smaller than said given width and being adapted to guide magnetic tape of relatively small width in a transverse direction across said surface, a plurality of magnetic recording and reproducing heads, and means positioning said heads across said given width in said body in operative relation with a magnetic tape guided thereby in a manner whereby at least one of said heads is positioned in operative relation to each magnetic tape guiding surface.

8. A magnetic tape guiding device comprising a body of insulating material having a substantially flat surface of a given width, said surface being adapted to guide magnetic tape of relatively large width in a transverse direction across said surface, a first depression in said surface having a width substantially smaller than said given width and being adapted to guide magnetic tape of relatively small width in a transverse direction across said surface, a plurality of magnetic recording and reproducing heads, and means positioning said heads substantially linearly across said given width in said body in operative relation with a magnetic tape guided thereby in a manner whereby at least one of said heads is positioned in operative relation to each magnetic tape guiding surface.

References Cited in the file of this patent

UNITED STATES PATENTS

| | | |
|---|---|---|
| 1,955,938 | Berkowitz | Apr. 24, 1934 |
| 1,989,754 | Kindelmann et al. | Feb. 5, 1935 |
| 2,721,905 | Munroe | Oct. 25, 1955 |